US 8,289,670 B2

(12) United States Patent
Aronson et al.

(10) Patent No.: US 8,289,670 B2
(45) Date of Patent: Oct. 16, 2012

(54) ADAPTIVE POWER MANAGEMENT SYSTEM FOR AIRCRAFT GALLEYS

(75) Inventors: William D. Aronson, Olathe, KS (US); Joseph C. Dettmer, Overland Park, KS (US); Sebastien A. Ramus, Shawnee, KS (US)

(73) Assignee: B/E Intellectual Property, Lenexa, KS (US)

( * ) Notice: Subject to any disclaimer, the term of this patent is extended or adjusted under 35 U.S.C. 154(b) by 957 days.

(21) Appl. No.: 12/251,382

(22) Filed: Oct. 14, 2008

(65) Prior Publication Data

US 2009/0103221 A1 Apr. 23, 2009

Related U.S. Application Data

(60) Provisional application No. 60/980,709, filed on Oct. 17, 2007.

(51) Int. Cl.
*H02H 3/08* (2006.01)
*H02H 9/02* (2006.01)
(52) U.S. Cl. ...................... 361/93.2; 361/93.1
(58) Field of Classification Search ......... 361/93.1–93.2
See application file for complete search history.

(56) References Cited

U.S. PATENT DOCUMENTS 6,049,143 A * 4/2000 Simpson et al. ............... 307/126
7,098,555 B2 8/2006 Glahn et al.
2005/0121978 A1* 6/2005 McAvoy ........................ 307/43
2006/0108873 A1* 5/2006 Hamasaki et al. ........... 307/10.1
2007/0188954 A1* 8/2007 Wiese et al. ................... 361/62
2009/0021879 A1* 1/2009 Rivers et al. ................ 361/93.2

FOREIGN PATENT DOCUMENTS

| EP | 1294068 A | 3/2003 |
| EP | 1560311 A | 8/2005 |
| EP | 1650846 A | 4/2006 |
| GB | 2428311 A | 1/2007 |
| WO | 94/13037 A | 6/1994 |

OTHER PUBLICATIONS

Ametek Aug. 8, 2005; http://www.ametek.com/press/press.cfm?Style=display&Press_ID=385; Amphion Solid-State Power Controller From Ametek Helps Take Cabin Electronics to the Next Level.
Tyko Electronics Oct. 11, 2006; http://www.tycoelectronics.com/AboutUS/news/prodnews.asp?id=1086; Aircraft Galleys Gain Modularity With GPR Connectors.
Radiall Jan. 2005; http://www.radiall.com/vdocportal/portal/template/param2col/app/radiallWebSite?pageID=030-00001k-000; EPXB for galley inserts.
International Search Report issued May 27, 2009, pp. 1-4.

* cited by examiner

*Primary Examiner* — Dharti Patel
(74) *Attorney, Agent, or Firm* — Fulwider Patton LLP

(57) ABSTRACT

The adaptive power management system for aircraft galleys includes one or more programmable circuit breakers for corresponding interchangeable aircraft galley inserts. Current rating settings of the programmable circuit breakers can be changed by direct interrogation by a galley network controller, which can also automatically switch selected circuit breakers to open to shut down the power supply to an entire galley complex or individual galley inserts, as needed, or by a passive signal.

21 Claims, 2 Drawing Sheets

ADAPTIVE POWER MANAGEMENT SYSTEM FOR AIRCRAFT GALLEYS

CROSS-REFERENCES TO RELATED APPLICATIONS

This application is based upon Provisional Application No. 60/980,709, filed 17 Oct. 2007.

BACKGROUND OF THE INVENTION

The present invention relates generally to the field of power distribution, and more particularly relates to an adaptive power management system for aircraft galleys.

Current aircraft galleys utilize circuit breakers with fixed settings (10 amps, 15 amps, 20 amps, and the like) for the purposes of supporting a flexible product installation into a common/modular aircraft galley, such as is described in ARINC 810 and ARINC 812, for example. ARINC 810 describes dimensional and safety requirements for standard interfaces and physical interfaces for galley insert equipment, such as various types of beverage makers (size 1), ovens/refrigerators (size 2), carts/trash compactors (size 3), and containers/bun warmers (size 4), for example. ARINC 812 describes requirements for standard data and network interfaces for galley insert (GAIN) equipment. The circuit breakers for such an installation of aircraft galley insert devices are commonly sized according to the maximum current draw expected from the insert, and based on the gauge of the wiring. In order to provide adequate circuit protection, the circuit breaker rating should be higher than the maximum current draw of the insert, but low enough to protect the wiring of the galley in case of equipment malfunction.

With conventional fixed capacity circuit breakers, it is currently not possible to install an insert in an aircraft galley with a different current draw capacity than the existing circuit breaker to which is to be connected, without replacing the circuit breaker. For example, if a coffee maker with a maximum draw of 8 amps were originally installed in the galley, galley manufacturers typically would have installed a 10 amp circuit breaker. If at a later date, the airline were to elect to replace the coffee maker with a water boiler with a maximum current capacity of 13 amps, the galley of the aircraft would have to be modified with a higher rated circuit breaker (e.g. 15 amps). Due to the level of documentation required to modify previously certified aircraft equipment, the cost to recertify such modifications is high.

In addition, if it becomes necessary during flight to either shut down the power supply to a galley complex or to an individual galley insert, in existing aircraft galleys, this operation can only be achieved manually by having a crew member physically pull open the necessary individual circuit breakers.

It would be desirable to provide a power management system for aircraft galleys that can adapt available current draw capacity for various current demands of various interchangeable aircraft galley inserts, without requiring ad hoc replacement of circuit breakers. It would also be desirable to provide a power management system for aircraft galleys that can automatically shut down the power supply to a galley complex or to an individual galley insert. The present invention meets these and other needs.

SUMMARY OF THE INVENTION

Briefly, and in general terms, the present invention provides for an adaptive power management system for aircraft galleys that provides appropriate current settings to programmable circuit breakers for the respective current demands of interchangeable aircraft galley inserts without requiring replacement of the circuit breakers, and that in one presently preferred embodiment includes a galley network controller that can automatically switch selected circuit breakers to open in order to thereby shut down the power supply to an entire galley complex or individual galley inserts, as needed. The programmable circuit breakers can be used to safely limit current to each galley insert device, with the current limit being determined based on a direct interrogation or passive signal to communicate the proper settings to the programmable circuit breakers in the galley.

Other features and advantages of the present invention will become more apparent from the following detailed description of the preferred embodiments in conjunction with the accompanying drawings, which illustrate, by way of example, the operation of the invention.

DETAILED DESCRIPTION OF THE PREFERRED EMBODIMENTS

Figure 1:
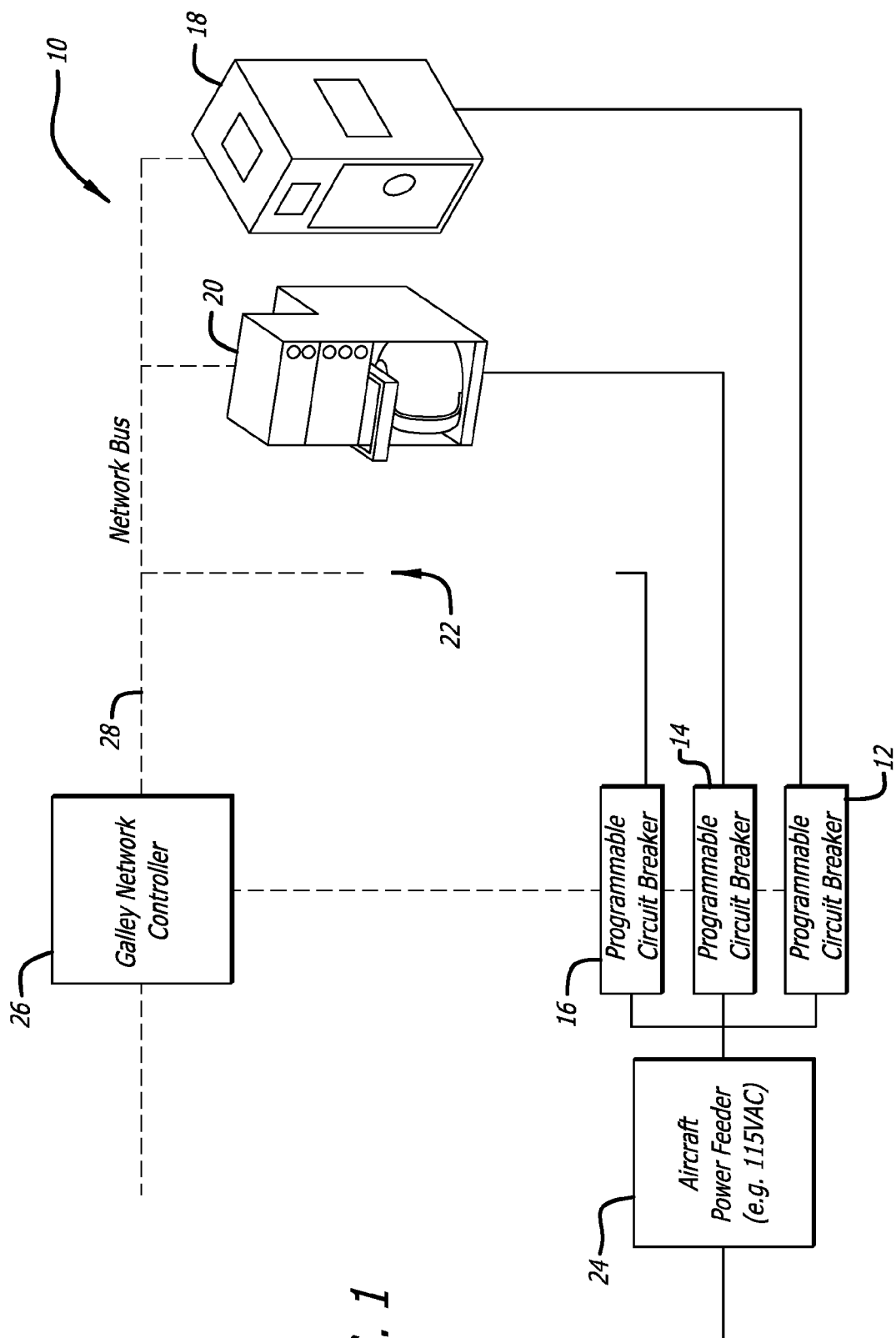
FIG. 1 is a schematic diagram of a first embodiment of the adaptive power management system for aircraft galleys according to the present invention.

Referring to the drawings, which are provided by way of example, and not by way of limitation, the present invention provides for an adaptive power management system for aircraft galleys. The adaptive power management system provides appropriate current settings to programmable circuit breakers for the respective current demands of corresponding interchangeable aircraft galley inserts, without requiring replacement of the circuit breakers.

Referring to FIG. 1, in a first preferred embodiment, the adaptive power management system 10 of the present invention includes one or more programmable circuit breakers 12, 14, 16, for providing electrical power to corresponding galley inserts, such as an oven 18, coffee maker 20, or one or more additional bays 22 for other insert apparatus, such as a water boiler, toaster, cooler (not shown), for example, or similar suitable electrical appliances. The programmable circuit breakers are operatively connected to and receive electrical power from an aircraft power feeder 24, and are operatively connected to a galley network controller 26, which is also operatively connected to each of the galley inserts by a network bus 28 to determine their electrical current requirements and communicate the proper current rating setting to the corresponding programmable circuit breakers in the galley. In a presently preferred aspect, should it become necessary, the galley network controller can automatically switch selected circuit breakers to open (in a process which could be called "load shedding") to shut down the power supply to an entire galley complex or individual galley inserts.

Figure 2:
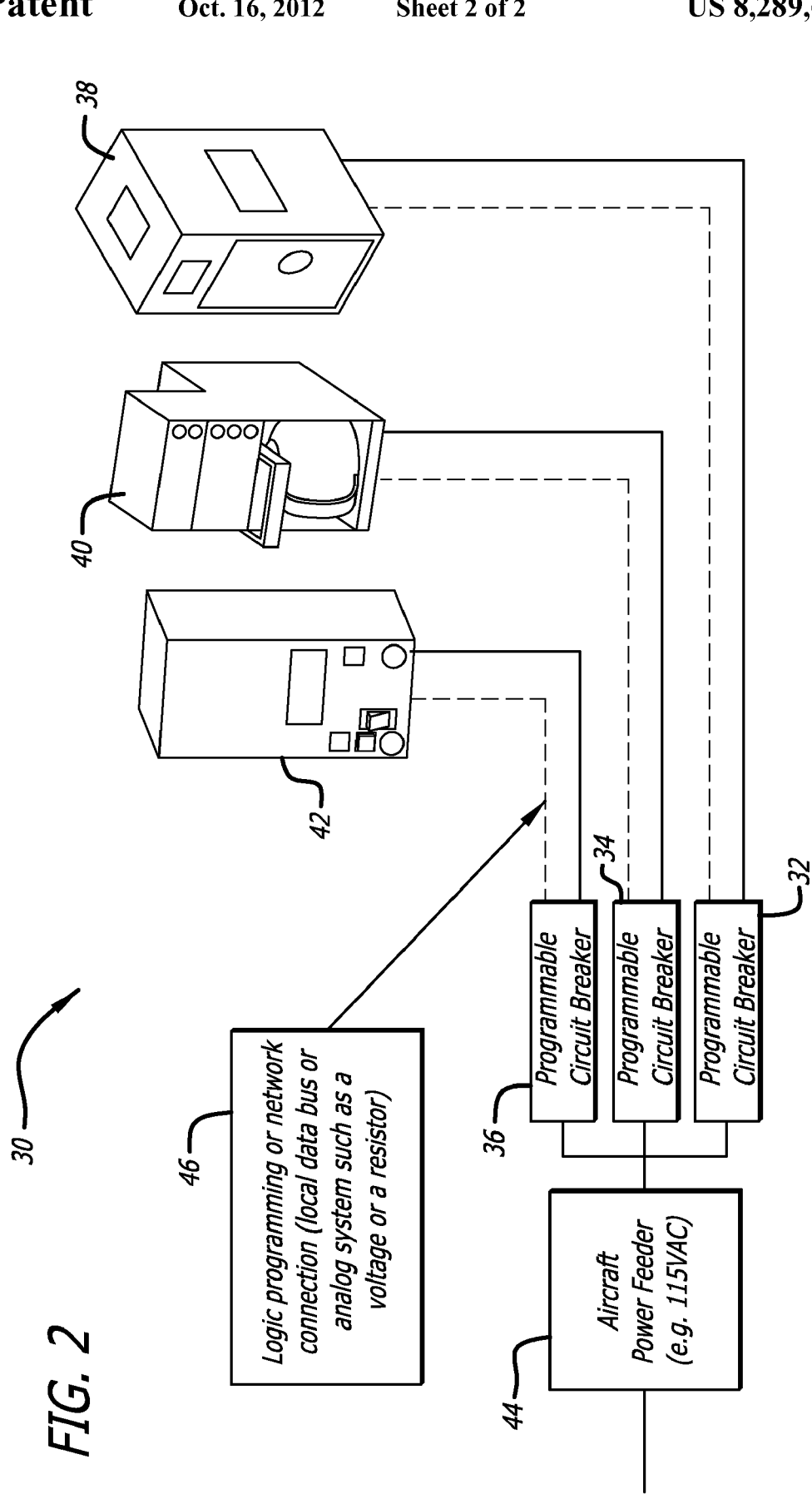
FIG. 2 is a schematic diagram of a second embodiment of the adaptive power management system for aircraft galleys according to the present invention.

Referring to FIG. 2, in a second preferred embodiment, the adaptive power management system 30 of the present invention includes one or more programmable circuit breakers 32, 34, 36, for providing electrical power to corresponding galley insert devices, such as an oven 38, coffee maker 40, or a water boiler 42, or one or more additional bays for other insert devices, such as a toaster or cooler (not shown), for example, or similar suitable electrical appliances. The programmable circuit breakers are operatively connected to and receive electrical power from an aircraft power feeder 44, and are operatively connected to the galley insert apparatus. The programmable circuit breakers in this embodiment may be keyed to be set to a proper current rating setting for the corresponding galley insert devices by a passive signal system 46, such as from a connector pin coding, for example, or by logic programming or a network connection with the corresponding galley insert devices, such as by a local data bus or analog system, such as a voltage or a resistor, for example.

The adaptive power management system of the present invention allows galley inserts of varying power consumption levels to be used interchangeably in the same galley insert cavity with no need to make any modification to the galley. For example, an insert that consumes 5000 Watts could be used in the same slot (galley insert location) that could be used for an insert that needs only 1200 watts, without modifying the aircraft galley design.

Since the galley insert apparatus would be configured to communicate the proper current settings to the programmable circuit breakers either through the galley network controller or directly to the programmable circuit breakers, the programmable circuit breakers can limit the current provided to the galley inserts to safe levels in the same physical circuit, supporting multiple devices with different current draws.

By locating this function in the galley, overall cost can be minimized for the systems at a macro level. This is due to the fact that most airlines carry a significant number of spare inserts. Thus if each galley (of which there are few spares) has the adaptive power management system of the present invention installed, the total number of spares required is less than if each galley insert has a circuit breaker with a fixed current setting installed.

The use of programmable circuit breakers in conjunction with aircraft galley equipment offers numerous advantages. First, should the airline decide to replace a galley insert with equipment having a different current draw requirement (higher or lower), the galley circuit breaker setting will be adjusted automatically without a need for modification of the galley design. Second, should it become necessary during flight to either shut down the power supply to a galley complex, or to an individual galley insert, the galley network controller can switch selected circuit breakers to open, thus accomplishing load shedding.

Should the programmable circuit breakers be equipped with a current measuring capability, the current measurements can be provided back to the galley network controller. This information can be used by the galley network controller to verify the proper operation of the galley insert devices and to manage the power consumption of other inserts installed in the galley.

It will be apparent from the foregoing that while particular forms of the invention have been illustrated and described, various modifications can be made without departing from the spirit and scope of the invention. Accordingly, it is not intended that the invention be limited, except as by the appended claims.

The invention claimed is:

1. An adaptive power management system for an aircraft galley, the adaptive power management system comprising:
   at least one galley insert apparatus having an electrical current rating;
   at least one corresponding programmable circuit breaker operatively connected to said at least one galley insert apparatus for providing electrical power to said at least one galley insert apparatus, respectively; and
   means for communicating an electrical current rating setting corresponding to said electrical current rating of said at least one galley insert apparatus to said at least one corresponding programmable circuit breaker.

2. The adaptive power management system of claim 1, wherein said means for communicating an electrical current rating setting comprises a galley network controller operatively connected to each said at least one galley insert apparatus to determine said electrical current rating of said at least one galley insert apparatus and to communicate said electrical current rating to at least one corresponding programmable circuit breaker.

3. The adaptive power management system of claim 2, wherein said galley network controller is operative to switch said at least one programmable circuit breaker to open to interrupt the power supply to said at least one galley insert device.

4. The adaptive power management system of claim 1, wherein said means for communicating an electrical current rating setting comprises means for communicating a passive signal from said at least one galley insert apparatus indicating said electrical current rating of said at least one galley insert apparatus to said at least one corresponding programmable circuit breaker.

5. The adaptive power management system of claim 4, wherein said means for communicating a passive signal comprises a connector pin coding.

6. The adaptive power management system of claim 4, wherein said means for communicating a passive signal comprises logic programming of said at least one corresponding programmable circuit breaker.

7. The adaptive power management system of claim 4, wherein said means for communicating a passive signal comprises a network connection with at least one galley insert apparatus.

8. The adaptive power management system of claim 7, wherein said network connection with at least one galley insert apparatus comprises a local data bus operatively connected between said at least one galley insert apparatus and said at least one corresponding programmable circuit breaker.

9. The adaptive power management system of claim 7, wherein said network connection with at least one galley insert apparatus comprises an analog system operatively connected between said at least one galley insert apparatus and said at least one corresponding programmable circuit breaker.

10. An adaptive power management system for an aircraft galley, the adaptive power management system comprising:
    at least one galley insert apparatus having an electrical current rating;
    at least one corresponding programmable circuit breaker operatively connected to said at least one galley insert apparatus for providing electrical power to said at least one galley insert apparatus, respectively; and
    a galley network controller operatively connected to each said at least one galley insert apparatus, said galley network controller being operative to determine said electrical current rating of said at least one galley insert apparatus and to communicate an electrical current rating setting corresponding to said electrical current rating of said at least one galley insert apparatus to said at least one corresponding programmable circuit breaker.

11. The adaptive power management system of claim 10, wherein said galley network controller is operative to switch said at least one programmable circuit breaker to open to interrupt the power supply to said at least one galley insert device.

12. An adaptive power management system for an aircraft galley, the adaptive power management system comprising:

at least one galley insert apparatus having an electrical current rating;

at least one corresponding programmable circuit breaker operatively connected to said at least one galley insert apparatus for providing electrical power to said at least one galley insert apparatus, respectively; and means for communicating a passive signal from said at least one galley insert apparatus indicating said electrical current rating setting corresponding to said electrical current rating of said at least one galley insert apparatus to said at least one corresponding programmable circuit breaker.

13. The adaptive power management system of claim 12, wherein said means for communicating a passive signal comprises a connector pin coding.

14. The adaptive power management system of claim 12, wherein said means for communicating a passive signal comprises logic programming of said at least one corresponding programmable circuit breaker.

15. The adaptive power management system of claim 12, wherein said means for communicating a passive signal comprises a network connection with at least one galley insert apparatus.

16. The adaptive power management system of claim 15, wherein said network connection with at least one galley insert apparatus comprises a local data bus operatively connected between said at least one galley insert apparatus and said at least one corresponding programmable circuit breaker.

17. The adaptive power management system of claim 15, wherein said network connection with at least one galley insert apparatus comprises an analog system operatively connected between said at least one galley insert apparatus and said at least one corresponding programmable circuit breaker.

18. A method of adaptive power management for an aircraft galley, the method comprising:

providing at least one galley insert apparatus having an electrical current rating;

providing at least one corresponding programmable circuit breaker operatively connected to said at least one galley insert apparatus for providing electrical power to said at least one galley insert apparatus, respectively; and communicating an electrical current rating setting corresponding to said electrical current rating of said at least one galley insert apparatus to said at least one corresponding programmable circuit breaker.

19. The method of claim 18, further comprising the step of determining said electrical current rating of said at least one galley insert apparatus prior to said step of communicating said electrical current rating setting corresponding to said electrical current rating of said at least one galley insert apparatus to said at least one corresponding programmable circuit breaker.

20. The method of claim 18, further comprising the step of switching said at least one programmable circuit breaker to open to interrupt the power supply to said at least one galley insert device.

21. The method of claim 18, wherein said step of communicating an electrical current rating setting comprises communicating a passive signal from said at least one galley insert apparatus indicating said electrical current rating of said at least one galley insert apparatus to said at least one corresponding programmable circuit breaker.

\* \* \* \* \*